(12) United States Patent
Liu et al.

(10) Patent No.: US 11,327,193 B2
(45) Date of Patent: May 10, 2022

(54) METHOD AND DEVICE FOR IMAGING DIFFRACTED WAVES BASED ON AZIMUTH-DIP ANGLE GATHERS, AND STORAGE MEDIUM

(71) Applicant: Institute of Geology and Geophysics, Chinese Academy of Sciences, Beijing (CN)

(72) Inventors: Linong Liu, Beijing (CN); Zhengwei Li, Beijing (CN); Baokun Lu, Beijing (CN); Jiangjie Zhang, Beijing (CN); Jianfeng Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/378,981

(22) Filed: Jul. 19, 2021

(65) Prior Publication Data
US 2022/0043175 A1    Feb. 10, 2022

(51) Int. Cl.
*G01V 1/32*     (2006.01)
*G01V 1/30*     (2006.01)
*G01V 1/00*     (2006.01)

(52) U.S. Cl.
CPC .............. *G01V 1/32* (2013.01); *G01V 1/003* (2013.01); *G01V 1/30* (2013.01)

(58) Field of Classification Search
CPC ............. G01V 1/32; G01V 1/003; G01V 1/30
See application file for complete search history.

(56) References Cited

U.S. PATENT DOCUMENTS 9,726,771 B1 *  8/2017  Popovici ................ G01V 1/302
9,733,371 B2 *  8/2017  Burnett .................... G01V 1/30
(Continued)

FOREIGN PATENT DOCUMENTS

| CN | 104297789 | 1/2015 |
| CN | 109143362 | 1/2019 |
| CN | 110286410 | 9/2019 |

OTHER PUBLICATIONS

Benfield et al., "Diffraction imaging—a tool to reduce exploration and development risk" first break, vol. 34. pp 57-63 (Year: 2016).*
(Continued)

*Primary Examiner* — Ian J Lobo
(74) *Attorney, Agent, or Firm* — Hogan Lovells US LLP

(57) ABSTRACT

The present disclosure provides a method and a device for imaging diffracted waves based on azimuth-dip angle gathers and a storage medium, which relates to the technical field of seismic exploration, comprising firstly acquiring seismic data and generating target azimuth-dip angle gathers based on the seismic data, wherein the target azimuth-dip angle gathers are a set of all azimuth-dip angle gathers in which the Fresnel zones have been muted, and each of the azimuth-dip angle gathers represents a dip-angle gather corresponding to each azimuth angle; then detecting diffracted waves based on the target azimuth-dip angle gathers, and determining the type of the diffracted waves; and finally, imaging the diffracted waves based on the type of the diffracted waves to obtain a diffracted wave imaging result.

13 Claims, 7 Drawing Sheets

(56) References Cited

U.S. PATENT DOCUMENTS

2010/0131205 A1    5/2010  Berkovitch et al.
2021/0063570 A1*  3/2021  Liu ........................ G01V 1/34

OTHER PUBLICATIONS

Li et al., "Separating and imaging diffractions of seismic waves in the full-azimuth dip-angle domain", Journal of Geophysics and Engineering, vol. 17, Issue 2, Apr. 2020, pp. 339-356, https://doi.org/10.1093/jge/gxz110, published Dec. 2019 (Year: 2020).*
Koren et al., "Full-Azimuth subsurface angle domain wavefield decomposition and imaging Part I: Directional and reflection image gathers" Geophysics, vol. 76, No. 1, pp. S1-S13 (Year: 2011).*
Zhang et al., "Diffraction imaging using shot and opening-angle gathers : A prestack time migration approach", Geophysics, vol. 79, No. 2 pp. S23-S33 (Year: 2014).*
English Translations of Chinese Foreign Patent Documents (Abstracts Only).
Notification to Grant Patent Right for Invention of CN Application No. 202010793059.6 (English Translation).
CN First Office Action of CN Application No. 202010793059.6 (English Translation).
CN Patent Search Record from 202010793059.6 (English Translation).

* cited by examiner

METHOD AND DEVICE FOR IMAGING DIFFRACTED WAVES BASED ON AZIMUTH-DIP ANGLE GATHERS, AND STORAGE MEDIUM

CROSS-REFERENCE TO RELATED APPLICATIONS

The present disclosure claims priority to Chinese Patent Application No. 202010793059.6, filed with the Chinese Patent Office on Aug. 7, 2020, entitled "Method and Device for Imaging Diffracted Waves Based on Azimuth-dip Angle Gathers", which is incorporated herein by reference in its entirety.

TECHNICAL FIELD

The present disclosure relates to the technical field of seismic exploration, and in particular to a method and a device for imaging diffracted waves based on azimuth-dip angle gathers and a storage medium.

BACKGROUND ART

In seismic exploration, geophysicists have made efforts to improve the resolution of seismic data for underground structures. People have also proposed many methods and technologies to improve the resolution of seismic data. For example, based on the law of seismic wave propagation in viscous media, a pre-stack imaging technology for compensating medium absorption has been developed. This technology allows compensation for high-frequency attenuation of seismic waves in a medium along the propagation path of seismic wave, thereby achieving the purpose of improving the resolution of a seismic migration imaging profile. However, since reflected wave energy is dominant in this profile, its resolution is limited by the Ricker's criterion, which does not always meet the needs of refined interpretation. On the other hand, the seismic waves received on the ground not only include reflected waves (or reflections), but also diffracted waves (or diffractions) under certain conditions, for example, when discontinuities occur at the underground interface due to faults, pinch-outs, or unconformities, etc., or when the radius of curvature of the curved interface is less than a few seismic wavelengths, as well as the development of underground dissolution pores and fractures. Therefore, diffracted waves can be considered as markers of subsurface structural and lithologic anomalies. From the perspective of improving the resolution, an effect of surpassing the resolution limited by the Ricker's criterion can be achieved with diffracted waves, as compared with reflected waves.

The energy of diffracted waves is weaker than that of reflected waves by one to two orders of magnitude. Therefore, imaging of diffracted waves is confronted with a huge challenge. Usually, people firstly separate diffracted and reflected waves from the whole wave field and then image the diffracted waves separately. Methods for separating diffracted waves can be broadly divided into two categories. In the first category, the different trajectory characteristics of diffracted and reflected wave in the data domain are used to separate the two by means of signal analysis. For example, the diffracted waves are separated by applying a method such as dip filtering or Radon filtering to pre-stack data, and then imaged. However, it is very difficult to separate diffracted and reflected waves correctly in the data domain when they interfere with each other. In the second category, a kind of migrated gather, such as dip-angle gather is constructed. In the dip-angle gathers, the obvious difference between reflected and diffracted wave is used to separate the two, and then obtain the imaging results of the diffracted wave. Therefore, it is possible to make a fine image of the geologic discontinuities in the subsurface media. This is a more effective method. However, most of the currently developed methods for separating diffracted and reflected waves based on dip-angle gathers and then imaging the diffracted waves separately are two-dimensional methods. Such methods fail to distinguish between common important types of diffracted waves.

Therefore, the prior art has the problems of difficult separation of diffracted waves and reflected waves, indistinguishability of the specific type of the diffracted waves, and poor imaging accuracy.

SUMMARY

The objective of the present disclosure includes, but is not limited to, providing a method and a device for imaging diffracted waves based on azimuth-dip angle gathers and a storage medium, so as to alleviate the technical problems of difficult separation of diffracted waves and reflected waves, indistinguishability of the specific type of the diffracted waves, and poor imaging accuracy in the prior art.

In order to achieve at least one of the above objectives, the following technical solutions are adopted in the present disclosure:

The present disclosure provides a method for imaging diffracted waves based on azimuth-dip angle gathers, comprising: acquiring seismic data and generating target azimuth-dip angle gathers based on the seismic data, wherein the target azimuth-dip angle gathers are a set of all azimuth-dip angle gathers from which Fresnel zones have been muted, each of the azimuth-dip angle gathers represent a dip-angle gather corresponding to each azimuth angle, and the azimuth angle is any azimuth angle in an azimuth angle set; detecting diffracted waves based on the target azimuth-dip angle gathers and determining a type of the diffracted waves; and imaging the diffracted waves based on the type of the diffracted waves to obtain a diffracted wave imaging result.

Optionally, as a possible implementation, the generation of target azimuth-dip angle gathers based on the seismic data includes: determining an azimuth angle set based on the seismic data; determining two mutually perpendicular azimuth angles in the azimuth angle set as standard azimuth angles; determining apparent dip angles corresponding to other azimuth angles based on dip angles corresponding to the standard azimuth angles, wherein the other azimuth angles are any azimuth angles in the azimuth angle set other than the standard azimuth angles; determining a Fresnel zone boundary corresponding to each of the azimuth angles based on the dip angle corresponding to each of the standard azimuth angles and the apparent dip angle corresponding to each of the other azimuth angles; determining a weight function corresponding to each of the azimuth angles based on the Fresnel zone boundary corresponding to each of the azimuth angles; and determining target azimuth-dip angle gathers based on the weight functions corresponding to all the azimuth angles and a preset azimuth-dip angle gather formula.

Optionally, as a possible implementation, after determining two mutually perpendicular azimuth angles in the azimuth angle set as standard azimuth angles, the method further includes: determining dip-angle gathers corresponding to the standard azimuth angles; and picking up dip angles corresponding to the standard azimuth angles by using a human-computer interactive pickup method based on the dip-angle gathers corresponding to the standard azimuth angles.

Optionally, as a possible implementation, the detection of diffracted waves based on the target azimuth-dip angle gathers includes: determining a correlation coefficient corresponding to each azimuth-dip angle gather in which the Fresnel zone has been muted, with the each azimuth-dip angle gather included in the target azimuth-dip angle gathers; comparing, with a preset correlation coefficient, the correlation coefficient corresponding to each azimuth-dip angle gather in which the Fresnel zone has been muted; and determining that diffracted waves are present in the seismic data, if at least one of the correlation coefficients corresponding to the azimuth-dip angle gathers in which the Fresnel zones have been muted is greater than the preset correlation coefficient.

Optionally, as a possible implementation, the method for imaging diffracted waves based on azimuth-dip angle gathers further includes: determining that no diffracted wave is present in the seismic data, if all the correlation coefficients corresponding to the azimuth-dip angle gathers in which the Fresnel zones have been muted are less than the preset correlation coefficient.

Optionally, as a possible implementation, the type of the diffracted waves includes tip diffracted waves and edge diffracted waves, and the determination of the type of the diffracted waves includes: judging whether the correlation coefficients corresponding to all the azimuth-dip angle gathers in which the Fresnel zones have been muted meet a preset tip diffracted wave condition or a preset edge diffracted wave condition; determining that the diffracted waves are of the type of tip diffracted waves, if the preset tip diffracted wave condition is met; and determining that the diffracted waves are of the type of edge diffracted waves, if the preset edge diffracted wave condition is met.

Optionally, as a possible implementation, the imaging of the diffracted waves based on the type of the diffracted waves to obtain a diffracted wave imaging result includes: if the diffracted waves are of the type of tip diffracted waves, stacking picked first dip-angle gathers to obtain a first diffracted wave imaging result, wherein the first dip-angle gather is a dip-angle gather with the Fresnel zone having been muted, which is corresponding to any azimuth angle; if the diffracted waves are of the type of edge diffracted waves, picking up a second dip-angle gather and subtracting energies on the two sides of an apparent dip angle corresponding to the second dip-angle gather to obtain a second diffracted wave imaging result, wherein the second dip-angle gather is a dip-angle gather in which the Fresnel zone has been muted, corresponding to an azimuth angle with the highest correlativity; and determining the first diffracted wave imaging result and/or the second diffracted wave imaging result as the diffracted wave imaging result.

The present disclosure provides a device for imaging diffracted waves based on azimuth-dip angle gathers, comprising: an acquisition and generation unit configured to acquire seismic data and generate target azimuth-dip angle gathers based on the seismic data, wherein the target azimuth-dip angle gathers are a set of all azimuth-dip angle gathers in which Fresnel zones have been muted, each of the azimuth-dip angle gathers represents a dip-angle gather corresponding to each azimuth angle, and the azimuth angle is any azimuth angle in an azimuth angle set; a detection and determination unit configured to detect diffracted waves based on the target azimuth-dip angle gathers and determine a type of the diffracted waves; and an imaging unit configured to image the diffracted waves based on the type of the diffracted waves to obtain a diffracted wave imaging result.

Optionally, as a possible implementation, the specific operations performed by the acquisition and generation unit include:

determining an azimuth angle set based on the seismic data;

determining two mutually perpendicular azimuth angles in the azimuth angle set as standard azimuth angles;

determining apparent dip angles corresponding to other azimuth angles based on dip angles corresponding to the standard azimuth angles, wherein the other azimuth angles are any azimuth angles in the azimuth angle set other than the standard azimuth angles;

determining a Fresnel zone boundary corresponding to each of the azimuth angles based on the dip angle corresponding to each of the standard azimuth angles and the apparent dip angle corresponding to each of the other azimuth angles;

determining a weight function corresponding to each of the azimuth angles based on the Fresnel zone boundary corresponding to each of the azimuth angles; and determining target azimuth-dip angle gathers based on the weight functions corresponding to all the azimuth angles and a preset azimuth-dip angle gather formula.

Optionally, as a possible implementation, the specific operations performed by the acquisition and generation unit include:

determining dip-angle gathers corresponding to the standard azimuth angles; and picking up dip angles corresponding to the standard azimuth angles by using a human-computer interactive pickup method based on the dip-angle gathers corresponding to the standard azimuth angles.

Optionally, as a possible implementation, the specific operations performed by the detection and determination unit include:

determining a correlation coefficient corresponding to each azimuth-dip angle gather in which the Fresnel zone has been muted, with the each azimuth-dip angle gather included in the target azimuth-dip angle gathers;

comparing, with a preset correlation coefficient, the correlation coefficient corresponding to each azimuth-dip angle gather in which the Fresnel zone has been muted; and determining that diffracted waves are present in the seismic data, if at least one of the correlation coefficients corresponding to the azimuth-dip angle gathers in which the Fresnel zones have been muted is greater than the preset correlation coefficient.

Optionally, as a possible implementation, the specific operations performed by the detection and determination unit include:

determining that no diffracted wave is present in the seismic data, if all the correlation coefficients corresponding to the azimuth-dip angle gathers in which the Fresnel zones have been muted are less than the preset correlation coefficient.

Optionally, as a possible implementation, the specific operations performed by the detection and determination unit include:

judging whether the correlation coefficients corresponding to all the azimuth-dip angle gathers in which the Fresnel zones have been muted meet a preset tip diffracted wave condition or a preset edge diffracted wave condition;

determining that the diffracted waves are of the type of tip diffracted waves, if the preset tip diffracted wave condition is met; and determining that the diffracted waves are of the type of edge diffracted waves, if the preset edge diffracted wave condition is met.

Optionally, as a possible implementation, the specific operations performed by the imaging unit include:

if the diffracted waves are of the type of tip diffracted waves, stacking picked first dip-angle gathers to obtain a first diffracted wave imaging result, wherein the first dip-angle gather is a dip-angle gather in which the Fresnel zone has been muted corresponding to any azimuth angle;

if the diffracted waves are of the type of edge diffracted waves, picking up a second dip-angle gather and subtracting energies on the two sides of an apparent dip angle corresponding to the second dip-angle gather to obtain a second diffracted wave imaging result, wherein the second dip-angle gather is a dip-angle gather in which the Fresnel zone has been muted corresponding to an azimuth angle with the highest correlativity; and determining the first diffracted wave imaging result and/or the second diffracted wave imaging result as the diffracted wave imaging result.

Optionally, as a possible implementation, a computer-executable non-volatile program code storage medium is provided. The storage medium stores program codes, which, when run by a computer, execute the method for imaging diffracted waves based on azimuth-dip angle gathers according to the claims as previously described.

The present disclosure provides a method and a device for imaging diffracted waves based on azimuth-dip angle gathers and a storage medium. Firstly, seismic data is acquired, and target azimuth-dip angle gathers are generated based on the seismic data, wherein the target azimuth-dip angle gathers are a set of all azimuth-dip angle gathers in which Fresnel zones have been muted, each of the azimuth-dip angle gathers represents a dip-angle gather corresponding to each azimuth angle, and the azimuth angle is any azimuth angle in an azimuth angle set. Then, diffracted waves are detected based on the target azimuth-dip angle gathers, and the type of the diffracted waves is determined. Finally, the diffracted waves are imaged based on the type of the diffracted waves to obtain a diffracted wave imaging result. In the present disclosure, in the generated target azimuth-dip angle gathers, dip-angle gathers corresponding to any azimuth angles are configured for the detection and imaging of diffracted waves, thus the target azimuth-dip angle gathers provide a three-dimensional basis for the detection and imaging of diffracted waves. In the present disclosure, the type of the diffracted waves is determined, and the diffracted waves are imaged based on the type of the diffracted waves. In this way, the type of the diffracted waves can be distinguished, and the diffracted waves can be imaged in a targeted manner, whereby the imaging accuracy is improved.

Additional features and advantages of the present disclosure will be set forth in the description which follows, and in part will be apparent from the description, or may be learned by the practice of the present disclosure. The objectives and additional advantages of the present disclosure may be realized and attained by means of the structures particularly pointed out in the description, the claims, and the accompanying drawings.

In order to enable clearer and easier understanding of the above objectives, features, and advantages of the present disclosure, preferred embodiments will be described in detail below by way of example with reference to the accompanying drawings.

BRIEF DESCRIPTION OF THE DRAWINGS

In order to more clearly illustrate technical solutions of specific embodiments of the present disclosure or of the prior art, drawings required for use in the description of the specific embodiments or the prior art will be described briefly below. It is obvious that the drawings in the following description are illustrative of some embodiments of the present disclosure. It will be understood by those of ordinary skill in the art that other drawings can also be obtained from these drawings without any inventive effort.

REFERENCE NUMERALS

Figure 1:
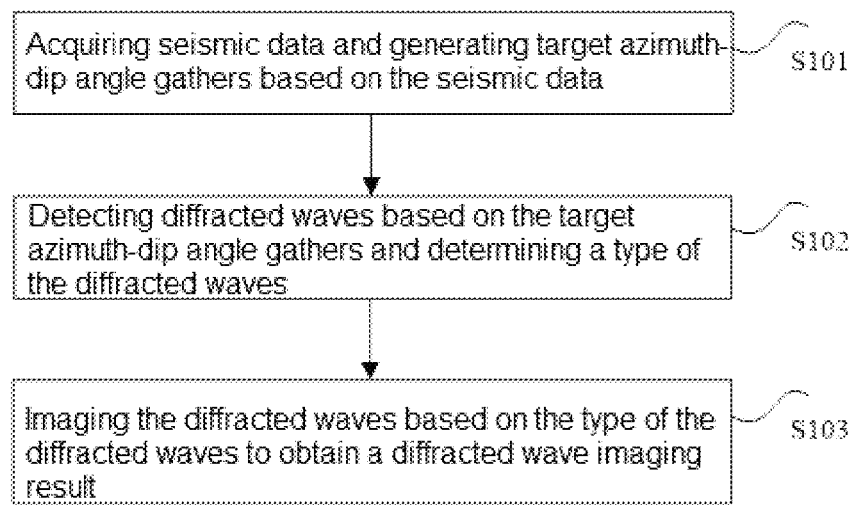
FIG. 1 is a flowchart of a method for imaging diffracted waves based on azimuth-dip angle gathers according to an embodiment of the present disclosure.

11: acquisition and generation unit; 12: detection and determination unit; 13: imaging unit.

DETAILED DESCRIPTION OF THE EMBODIMENTS

The technical solutions of the present disclosure will be described below clearly and completely in connection with the embodiments. It is apparent that the embodiments to be described are some, but not all of the embodiments of the present disclosure. All the other embodiments obtained by those of ordinary skill in the art in light of the embodiments of the present disclosure without inventive efforts will fall within the scope of the present disclosure as claimed.

Most of the currently developed methods for separating diffracted waves and reflected waves based on dip-angle gathers and then imaging the diffracted waves separately are two-dimensional methods. Such methods fail to distinguish between common important types of diffracted waves, such as diffracted waves resulting from faults, steep reef edges, karsts, or extensive systems of well-developed fractures in 3D cases. It is very necessary to distinguish between the above-mentioned types of diffracted waves in exploration practice. For example, the distinguishing between diffracted waves generated by fractured-vuggy reservoirs and by faults allows for judgment of whether the underground medium that generates the diffracted waves is a type of reservoir required in the industry. The three-dimensional study of diffracted waves resulting from fault surfaces allows for extraction of fault strike (or orientation) information carried by the diffracted waves. These requirements can hardly be achieved with the currently developed diffracted wave imaging technologies.

In view of this, the objective of the present disclosure includes at least providing a method and a device for imaging diffracted waves based on azimuth-dip angle gathers and a storage medium, by which reflected waves and diffracted waves can be correctly separated in three dimensions, and dip-angle gathers in any azimuth directions can be obtained and configured for the detection and imaging of diffracted waves, thereby distinguishing tip diffracted waves, caused by velocity anomalies such as holes, caves and lithological pinch-outs, from edge diffracted waves caused by faults. Fault strike information can be extracted and phase correction can also be implemented during the imaging of the edge diffracted waves caused by faults to improve the imaging accuracy.

Firstly, a method for imaging diffracted waves based on azimuth-dip angle gathers disclosed in an embodiment of the present disclosure will be described in detail, in order to facilitate the understanding of this embodiment.

As a specific implementation according to the present disclosure:

an embodiment of a method for imaging diffracted waves based on azimuth-dip angle gathers is provided according to an embodiment of the present disclosure. It should be noted that steps shown in flowcharts of the accompanying drawings may be executed on, for example, a computer system containing a group of computer-executable instructions, and although logical sequences are shown in the flowcharts, the steps shown or described may be executed in sequences different from those shown here in some cases.

FIG. 1 is a flowchart of a method for imaging diffracted waves based on azimuth-dip angle gathers according to an embodiment of the present disclosure. As shown in FIG. 1, the method includes the following steps:

Step S101, seismic data is acquired, and target azimuth-dip angle gathers are generated based on the seismic data.

In an embodiment of the present disclosure, seismic data may refer to common offset data. The target azimuth-dip angle gathers are a set of all azimuth-dip angle gathers in which Fresnel zones have been muted (or removed). Each azimuth-dip angle gather represents a dip-angle gather corresponding to each azimuth angle. The azimuth-dip angle gather from in the Fresnel zone has been muted represents a dip-angle gather in which the Fresnel zone has been muted, corresponding to an azimuth angle. The azimuth angle is any azimuth angle in an azimuth angle set. In an embodiment of the present disclosure, the azimuth angle set is recorded as $U=\{0°, 90°, \theta_1, \theta_2, \ldots, \theta_n\}$, and a dip-angle gather corresponding to each element e in the azimuth angle set U can be referred to as the azimuth-dip angle gather. Here, the value of $\theta$ is in a range of $[0,180°]$. In a dip-angle gather, the abscissa denotes a dip angle with a value in a range of $[-90°,90°]$, and the ordinate denotes two-way vertical traveltime. The value of each point in the dip-angle gather is set as an amplitude value at the corresponding dip angle and two-way vertical traveltime. It should be noted that dip-angle gathers corresponding to any azimuth angles in the azimuth angle set are stacked to obtain a complete conventional migration result.

In Step S102, diffracted waves are detected based on the target azimuth-dip angle gathers, and the type of the diffracted waves is determined.

In Step S103, the diffracted waves are imaged based on the type of the diffracted waves to obtain a diffracted wave imaging result.

An embodiment of the present disclosure provides a method for imaging diffracted waves based on azimuth-dip angle gathers. Firstly, seismic data is acquired, and target azimuth-dip angle gathers are generated based on the seismic data, then diffracted waves are detected based on the target azimuth-dip angle gathers, and the type of the diffracted waves is determined, and finally the diffracted waves are imaged based on the type of the diffracted waves to obtain a diffracted wave imaging result. In the embodiment of the present disclosure, in the generated target azimuth-dip angle gathers, dip-angle gathers corresponding to any azimuth angles are configured for the detection and imaging of diffracted waves, thus the target azimuth-dip angle gathers provide a three-dimensional basis for the detection and imaging of diffracted waves. In the embodiment of the present disclosure, the type of the diffracted waves is determined, and the diffracted waves are imaged based on the type of the diffracted waves. In this way, the type of the diffracted waves can be distinguished, and the diffracted waves can be imaged in a targeted manner, whereby the imaging accuracy is improved.

Figure 2:
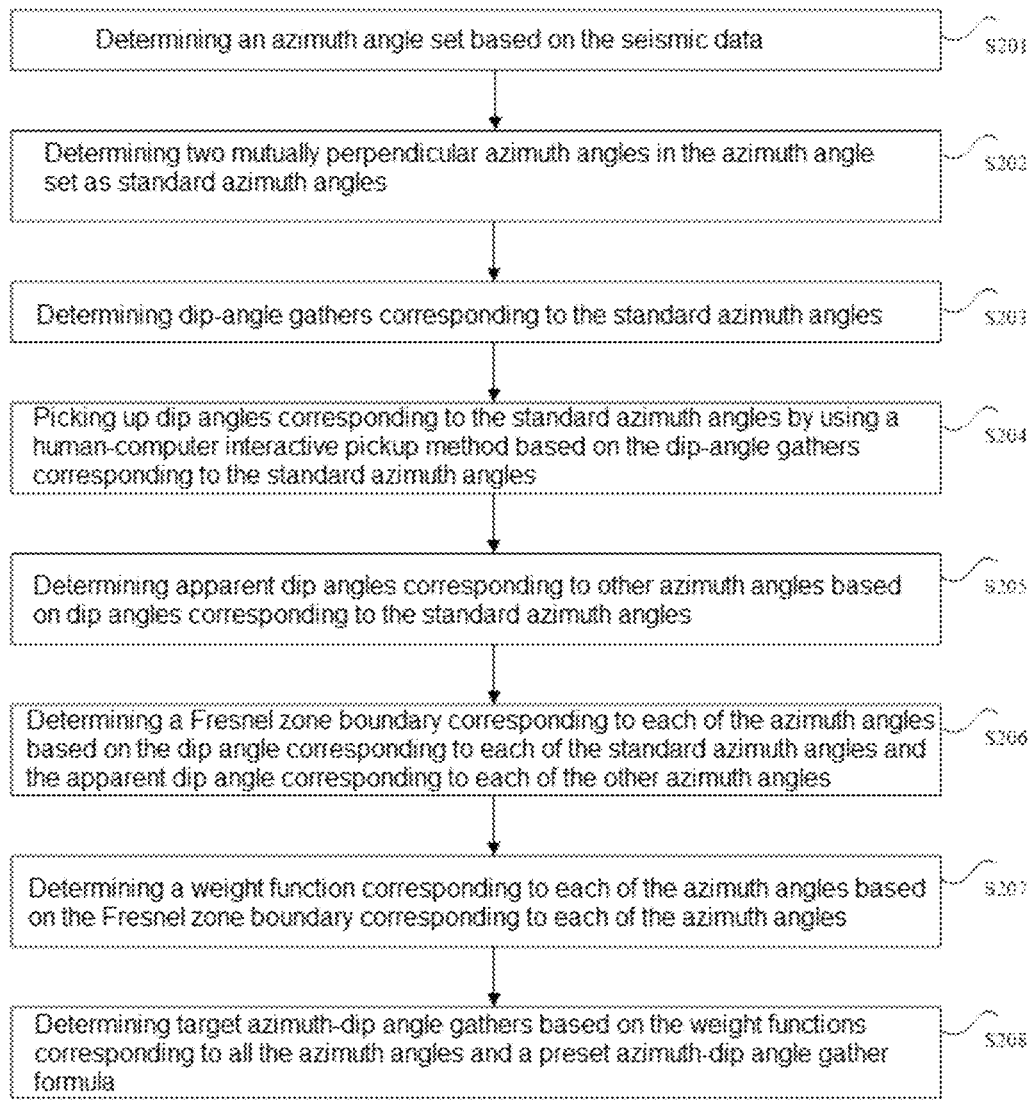
FIG. 2 is a flowchart of Step S101 in FIG. 1.

In an optional embodiment, as shown in FIG. 2, the generation of target azimuth-dip angle gathers based on the seismic data in the step S101 includes the following steps:

In Step S201, an azimuth angle set is determined based on the seismic data.

In Step S202, two mutually perpendicular azimuth angles in the azimuth angle set are determined as standard azimuth angles.

In an embodiment of the present disclosure, the standard azimuth angles may refer to 0° and 90°.

In Step S205, apparent dip angles corresponding to other azimuth angles are determined based on dip angles corresponding to the standard azimuth angles.

In an embodiment of the present disclosure, the other azimuth angles are any azimuth angles in the azimuth angle set other than the standard azimuth angles. The dip angles corresponding to the standard azimuth angles may be obtained according to the following steps S203 to S204. Based on the dip angles (or dip angle field) corresponding to $\theta=0°$ and $\theta=90°$, the apparent dip angles (or apparent dip angle field) at the other azimuth angles in the azimuth angle set U are calculated by the following method:

Let $\gamma_x$ and $\gamma_y$ be a dip angle (the dip angle is related to traveltime) corresponding to 0° and a dip angle corresponding to 90° respectively at an imaging point (x,y,T), then the apparent dip angle $\gamma_\theta$ of the imaging point (x,y,T) at other azimuth angle $\theta$ in the azimuth angle set U is calculated by:

$$\gamma_\theta = \arctan(\tan\gamma_x \cos\theta + \tan\gamma_y \sin\theta)$$

In Step S206, a Fresnel zone boundary corresponding to each azimuth angle is determined based on the dip angle corresponding to each standard azimuth angle and the apparent dip angle corresponding to each of the other azimuth angles.

In an embodiment of the present disclosure, an appropriate frequency (with a customizable magnitude) may be used to estimate the Fresnel zone corresponding to the azimuth angle $\theta$. The Fresnel zone boundary on two sides of the apparent dip angle (or called a stationary point) $\gamma_\theta$ corresponding to the imaging point (x,y,T) in the dip-angle gather corresponding to the azimuth angle $\theta$ may be obtained according to a dominant frequency $f_0$ of a half-derivative of a pre-stack seismic trace, and the apparent dip angle field corresponding to the azimuth angle $\theta$ obtained in Step S205, where the left boundary and the right boundary may be respectively expressed as:

left boundary:

$$\zeta_{\theta 1} = \arctan\left[\frac{1}{1-1/(2T_0 f_0)}\left(\tan\gamma_\theta - \frac{1}{\cos\gamma_\theta}\sqrt{1/(T_0 f_0) - 1/(2T_0 f_0)^2}\right)\right]$$

right boundary:

$$\zeta_{\theta 2} = \arctan\left[\frac{1}{1-1/(2T_0 f_0)}\left(\tan\gamma_\theta + \frac{1}{\cos\gamma_\theta}\sqrt{1/(T_0 f_0) - 1/(2T_0 f_0)^2}\right)\right]$$

where $[\zeta_{\theta 1}, \zeta_{\theta 2}]$ denotes the Fresnel zone corresponding to the imaging point (x,y,T) in the dip-angle gather corresponding to the azimuth angle $\theta$.

In Step S207, a weight function corresponding to each azimuth is determined based on the Fresnel zone boundary corresponding to the each azimuth angle.

In an embodiment of the present disclosure, the weight function corresponding to each azimuth angle is recorded as $w(\varphi_\theta)$ and calculated by the following formula:

$$w(\varphi_\theta) = \begin{cases} 1 & \varphi_\theta \leq \zeta_{\theta 1} - d\zeta \| \varphi_\theta \geq \zeta_{\theta 2} + d\zeta \\ \cos\left(\frac{\pi(\varphi_\theta - \zeta_{\theta 1} + d\zeta)}{2d\zeta}\right) & \zeta_{\theta 1} - d\zeta < \varphi_\theta < \zeta_{\theta 1} \\ \sin\left(\frac{\pi(\varphi_\theta - \zeta_{\theta 2})}{2d\zeta}\right) & \zeta_{\theta 2} < \varphi_\theta < \zeta_{\theta 2} + d\zeta \\ 0 & \zeta_{\theta 1} < \varphi_\theta < \zeta_{\theta 2} \end{cases}$$

where $d\zeta$ is the length of the attenuation band.

In Step S208, the target azimuth-dip angle gathers are determined based on the weight functions corresponding to all the azimuth angles and a preset azimuth-dip angle gather formula.

In an embodiment of the present disclosure, the preset azimuth-dip angle gather formula is expressed as:

$$I_\theta(x, y, T_0, \varphi_\theta) = \sum_{m=1}^{N} [g_m(\tau_s + \tau_g; x_s, y_s, x_g, y_g) w(\varphi_\theta)]$$

where $\theta$ is any azimuth angle in the azimuth angle set, (x,y,T) denotes the coordinates of the imaging point, $T_0 = 2T$ is the two-way vertical traveltime at the imaging point (x,y,T), $g_m$ is the half-derivative of the $m^{th}$ seismic trace, N is the total number of traces of input seismic pre-stack gathers, $(x_s, y_s)$ denotes the coordinates of a shot point corresponding to the $m^{th}$ seismic trace, $(x_g, y_g)$ denotes the coordinates of a geophone point corresponding to the $m^{th}$ seismic trace, $\tau_s$ and $\tau_g$ denote traveltime from the shot point and the geophone point to the imaging point, respectively, and $\varphi_\theta$ is a dip angle related to the traveltime corresponding to the azimuth angle $\theta$:

$$\varphi_\theta = \arctan\left[\frac{(x_s - x)\tau_g + (x_g - x)\tau_s}{(\tau_s + \tau_g)V_{rms}T}\cos\theta + \frac{(y_s - y)\tau_g + (y_g - y)\tau_s}{(\tau_s + \tau_g)V_{rms}T}\sin\theta\right]$$

where $V_{rms}$ is a root-mean-square velocity at the imaging point (x,y,T), and $w(\varphi_\theta)$ denotes a weight function with the dip angle $\varphi_\theta$ related to the traveltime as the independent variable.

By configuring the $w(\varphi_\theta)$ obtained in Step S207 into the above formula, the azimuth-dip angle gathers in which the Fresnel zones have been muted corresponding to all the azimuth angles in the azimuth angle set U may be obtained as:

$$I\text{Reflect\_cut}_\theta(x,y,T_0,\varphi_\theta), \theta = 0, 90, \theta_1, \theta_2, \ldots, \theta_n$$

In an optional embodiment, as shown in FIG. 2, after the Step S202 of determining two mutually perpendicular azimuth angles in the azimuth angle set as standard azimuth angles, the method further includes:

Step S203 of determining dip-angle gathers corresponding to the standard azimuth angles; and Step S204 of picking up dip angles corresponding to the standard azimuth angles by using a human-computer interactive pickup method based on the dip-angle gathers corresponding to the standard azimuth angles.

In an embodiment of the present disclosure, in the Step S203, dip-angle gathers corresponding to the standard azimuth angles may be determined by using the above-mentioned preset azimuth-dip angle gather formula. Here, the two mutually perpendicular azimuth angles (i.e., the standard azimuth angles) may be 0° and 90°. When the azimuth angle is 0°, let $w(\varphi_0) \equiv 1$, a dip-angle gather $I_0(x,y,T_0,\varphi_0)$ corresponding to the azimuth angle of 0° can be obtained. When the azimuth angle is 90°, let $w(\varphi_{90}) \equiv 1$, a dip-angle gather $I_0(x,y,T_0,\varphi_{90})$ corresponding to the azimuth angle of 90° can be obtained. It should be noted that when $w(\varphi_\theta) \equiv 1$, a dip-angle gather corresponding to any azimuth angle can be calculated by using the preset azimuth-dip angle gather formula in Step S208, which provides a basis for calculation of dip-angle gathers corresponding respectively to azimuth angles of 0°, 90°, 45°, 60°, 135°, and 150° in FIG. 5(a) to FIG. 7(b) described later. In Step S204, dip angles at all imaging points can be obtained by the human-computer interactive pickup method using the dip-angle gather $I_0(x,y,T_0,\varphi_0)$ corresponding to the azimuth angle of 0° and the dip-angle gather $I_0(x,y,T_0,\varphi_{90})$ corresponding to the azimuth angle of 90°, where the dip angle at an imaging point may refer to a stationary point at the imaging point, and all dip angles can form a dip angle field.

Figure 3:
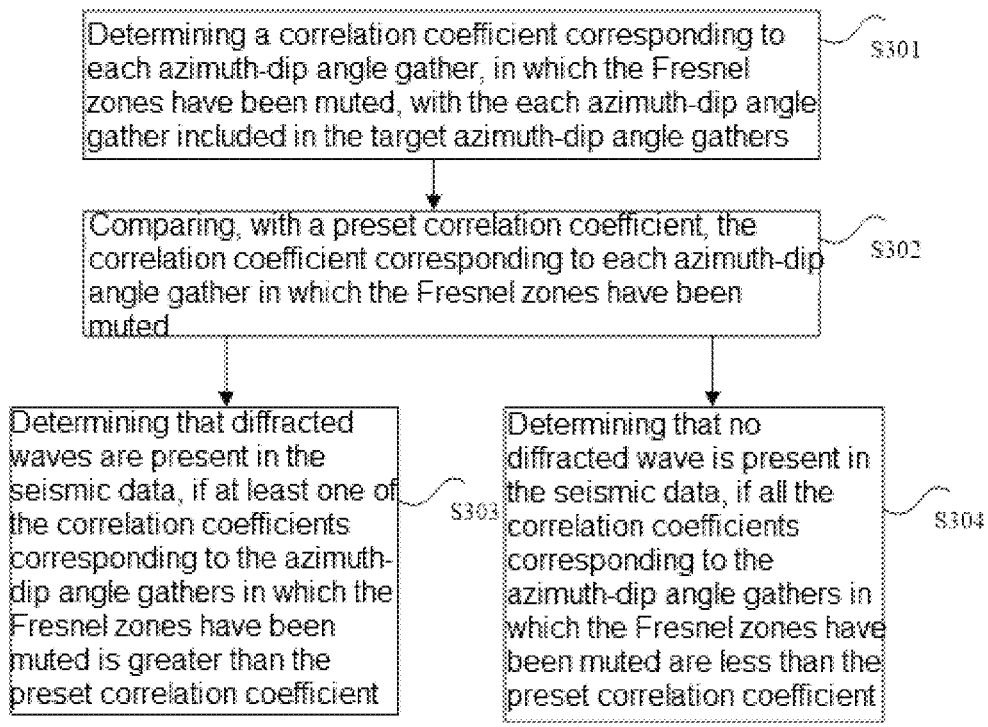
FIG. 3 is a flowchart of Step S102 in FIG. 1.

In an optional embodiment, as shown in FIG. 3, the detection of diffracted waves based on the target azimuth-dip angle gathers in the Step S102 includes:

Step S301 of determining a correlation coefficient corresponding to each azimuth-dip angle gather, in which the Fresnel zones have been muted, with the each azimuth-dip angle gather included in the target azimuth-dip angle gathers;

Step S302 of comparing, with a preset correlation coefficient, the correlation coefficient corresponding to each azimuth-dip angle gather in which the Fresnel zones have been muted; and Step S303 of determining that diffracted waves are present in the seismic data, if at least one of the correlation coefficients corresponding to the azimuth-dip angle gathers in which the Fresnel zones have been muted is greater than the preset correlation coefficient.

In an embodiment of the present disclosure, the correlation coefficient can be used as a sign for detecting the presence or absence of diffracted waves. The specific analysis is described as follows. In an azimuth-dip angle gather IReflect_cut$_\theta$(x,y,T$_0$,$\varphi_\theta$), $\theta \in U$ in which the Fresnel zones have been muted, a diffracted-wave event is detected at each time depth for each CDP (common depth point). The detection of a diffracted-wave event is based on the flatness of the diffracted-wave event in the azimuth-dip angle gather in which the Fresnel zone has been muted. A diffracted-wave event is detected on two respective sides of a stationary point $\gamma_\theta$ of a corresponding dip-angle gather, for each azimuth angle. A flat diffracted-wave event may be judged by a ratio (i.e., the correlation coefficient), and this ratio is denoted by $\xi_\theta(T_0)$, where:

$$\xi_\theta(T_0) = \Sigma_\theta A_i^W / (\Sigma_\theta |A_i^W|)$$

In the formula, $A_i^W$ represents the maximum amplitude (positive or negative) within a moving time window centered at $T_0$ in the $i^{th}$ trace of a dip-angle gather at an azimuth angle $\theta$ of a certain CDP.

In the calculation of the correlation coefficient, on the left side of the stationary point $\gamma_\theta$, the value of i starts from the minimum value to the left boundary $\zeta_{\theta 1}$ of the Fresnel zone. On the right side of the stationary point $\gamma_\theta$, the value of i starts from the right boundary $\zeta_{\theta 2}$ of the Fresnel zone to the maximum value. A threshold (i.e., a preset correlation coefficient) is set for $\xi_\theta(T_0)$ to detect the presence or absence of a diffracted-wave event. The presence of a diffracted-wave event indicates the presence of diffracted wave, and the absence of a diffracted-wave event indicates the absence of diffracted wave. Therefore, the presence or absence of a diffracted-wave event is consistent with the presence or absence of diffracted wave. For example, the threshold is 0.7, then $\xi_\theta(T_0) > 0.7$ can be used as a sign of the presence of diffracted waves.

In an optional embodiment, as shown in FIG. 3, the detection of diffracted waves based on the target azimuth-dip angle gathers in Step S102 further includes:

Step S304 of determining that no diffracted wave is present in the seismic data, if all the correlation coefficients corresponding to the azimuth-dip angle gathers in which the Fresnel zones have been muted are less than the preset correlation coefficient.

For any $T_0$, if the correlation coefficient $\xi_\theta(T_0)$ corresponding to the azimuth-dip angle gather IReflect_cut$_\theta$(x,y, T$_0$,$\varphi_\theta$) in which the Fresnel zones have been muted corresponding to any azimuth angle $\theta \in U$ is less than 0.7, it is considered that no diffracted-wave event is present at $T_0$, namely, no diffracted wave is present.

In an optional embodiment, the type of diffracted waves includes tip diffracted waves and edge diffracted waves. The determination of the type of diffracted waves includes:

Step 1 of judging whether the correlation coefficients corresponding to all the azimuth-dip angle gathers in which the Fresnel zones have been muted meet a preset tip diffracted wave condition or a preset edge diffracted wave condition;

Step 2 of determining that the diffracted waves are of the type of tip diffracted waves, if the preset tip diffracted wave condition is met; and Step 3 of determining that the diffracted waves are of the type of edge diffracted waves, if the preset edge diffracted wave condition is met.

In an embodiment of the present disclosure, the preset tip diffracted wave condition and the preset edge diffracted wave condition may be set and modified according to the actual situation. The specific meanings of the preset tip diffracted wave condition and the preset edge diffracted wave condition are not specifically limited in the embodiments of the present disclosure. Exemplarily, the preset tip diffracted wave condition may means that if a higher correlation coefficient (i.e., $\xi_\theta(T_0) > 0.7$) is detected on two sides of the stationary point $\gamma_\theta(T_0)$ in each of the azimuth-dip angle gathers IReflect_cut$_\theta$(x,y,T$_0$,$\varphi_\theta$) in which the Fresnel zones have been muted corresponding to all the azimuth angles, it is considered that an event of tip diffracted wave is present at $T_0$, and thus the diffracted waves are determined to be of the type of tip diffracted waves. In addition, tip diffracted waves may be caused by velocity anomalies such as holes and caves, or may be caused by lithological pinch-outs. Therefore, the preset tip diffracted wave condition may be set again in order to further distinguish between the causes of tip diffracted waves.

The preset edge diffracted wave condition includes the following four conditions: a): in an azimuth-dip angle gather IReflect_cut$_\theta$(x,y,T$_0$,$\varphi_\theta$) in which the Fresnel zone has been muted corresponding to a certain azimuth angle $\theta$, a correlation coefficient is higher $\xi_\theta(T_0) > 0.7$; b) the amplitudes on two sides of the stationary point $\gamma_\theta(T_0)$ in the azimuth-dip angle gather have opposite signs; c) in azimuth-dip angle gathers in which the Fresnel zones have been muted corresponding to other azimuth angles other than the azimuth angle $\theta$, correlation coefficients gradually decrease; and d) the correlation coefficient is minimum when the azimuth angle is $\theta + 90°$. If the above four conditions are met at the same time, it is considered that an event of edge diffracted wave is present at $T_0$, and thus the diffracted waves are determined to be of the type of edge diffracted waves. It should be noted that the azimuth angle $\theta + 90°$ indicates information on the strike of the linear diffractor.

In an optional embodiment, the Step S103 of imaging the diffracted waves based on the type of the diffracted waves to obtain a diffracted wave imaging result includes:

Step 11 of stacking picked first dip-angle gathers if the diffracted waves are of the type of tip diffracted waves, to obtain a first diffracted wave imaging result, wherein the first dip-angle gather is a dip-angle gather in which the Fresnel zone has been muted corresponding to any azimuth angle;

Step 12 of picking up a second dip-angle gather and subtracting energies on the two sides of an apparent dip angle corresponding to the second dip-angle gather if the diffracted waves are of the type of edge diffracted waves, to obtain a second diffracted wave imaging result, wherein the second dip-angle gather is a dip-angle gather in which the Fresnel zone has been muted corresponding to an azimuth angle with the highest correlativity; and Step 13 of determining the first diffracted wave imaging result and/or the second diffracted wave imaging result as the diffracted wave imaging result.

In an embodiment of the present disclosure, the azimuth-dip angle gathers IReflect_cut$_\theta$(x,y,T$_0$,φ$_\theta$) in which the Fresnel zones have been muted may be stacked in imaging to obtain a diffracted wave imaging result. Here, different types of diffracted waves correspond to different imaging modes. Specifically, if the diffracted waves are of the type of tip diffracted waves, a first diffracted wave imaging result can be obtained by imaging by stacking the dip-angle gathers in which the Fresnel zones have been muted corresponding to any azimuth angles. If the diffracted waves are of the type of edge diffracted waves, a second diffracted wave imaging result can be obtained by selecting a dip-angle gather in which the Fresnel zone has been muted corresponding to an azimuth angle with the highest correlativity and subtracting amplitudes on the two sides of the stationary point γ$_\theta$(T$_0$) corresponding to the dip-angle gather. The second diffracted wave imaging result is a phase-corrected diffracted wave imaging result.

An embodiment of the present disclosure will be described in detail by means of a three-dimensional diffraction model.

Figure 4:
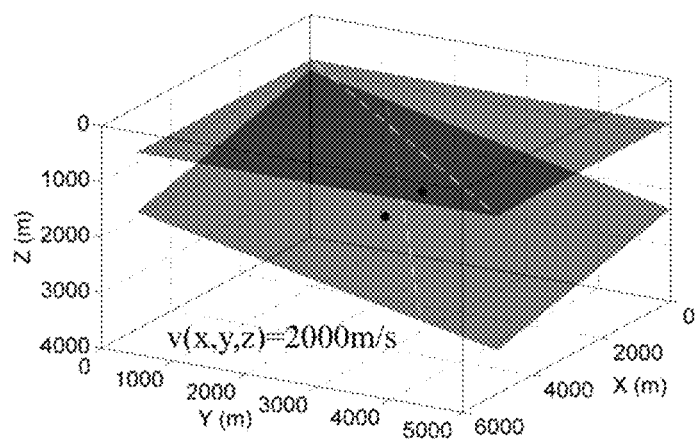
FIG. 4 shows a three-dimensional diffraction model using for generating the synthetic data set.

FIG. 4 is a three-dimensional diffraction model for generating synthetic data set. The three-dimensional diffraction model has a model background velocity of 2000 m/s and contains two thin layers and two independent diffraction points. In FIG. 4, the upper thin layer is a horizontal layer, and the lower thin layer is an inclined layer having apparent dip angles of 10° and 15° in xz- and yz-planes, respectively. Each of the two thin layers has a small fault shown by a white dashed line. The two upper and lower faults have strikes of 45° and 60°, respectively, and both have a fault displacement of 10 m. The two diffraction points shown by black dots have coordinates (2000,2000,2500) and (3000, 3000,1500), respectively.

Figures 5A, 5B:
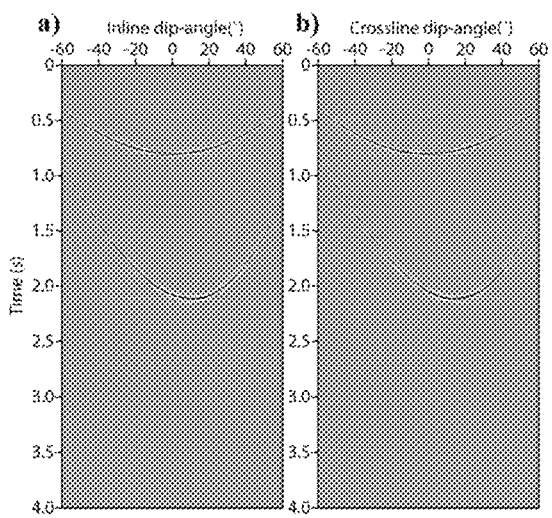
FIG. 5(a) and FIG. 5(b) show dip-angle gathers in the inline direction (at an azimuth angle of 0 degree) and crossline direction (at an azimuth angle of 90 degrees) at CDP coordinates (2500,2500), respectively.

Based on the model given in FIG. 4, two mutually perpendicular azimuth angles of 0° and 90° are selected as the standard azimuth angles, and dip-angle gathers corresponding to the azimuth angles of 0° and 90° are determined. FIG. 5(a) and FIG. 5(b) show dip-angle gathers in the inline direction (at an azimuth angle of 0 degree) and crossline direction (at an azimuth angle of 90 degrees) at CDP coordinates (2500,2500), respectively. It can be seen from FIG. 5(a) and FIG. 5(b) that the stationary points of the upper two downward convex events of reflected waves correspond to dip angles of 0° and 0°, respectively, and the stationary points of the lower two downward convex events of reflected waves correspond to dip angles of 10° and 15°, respectively. The dip angles are consistent with the values of the two apparent dip angles in FIG. 4.

Figures 6A, 6B:
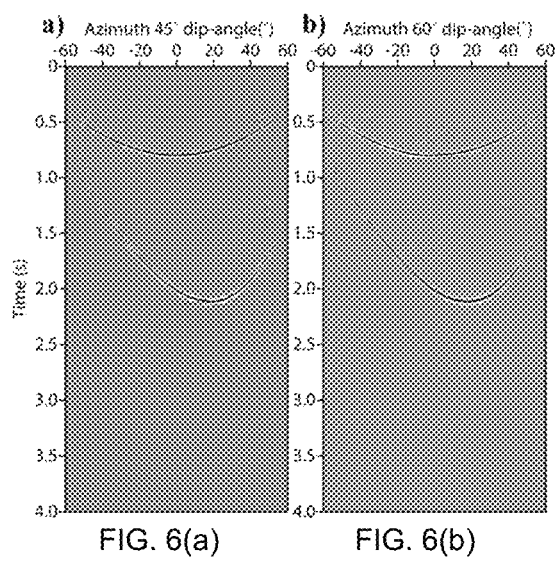
FIG. 6(a) and FIG. 6(b) show dip-angle gathers corresponding to azimuth angles of 45° and 60° at CDP coordinates (2500,2500), respectively.

FIG. 6(a) and FIG. 6(b) show dip-angle gathers corresponding to azimuth angles of 45° and 60° at CDP coordinates (2500,2500), respectively. The two upper and lower faults in FIG. 4 have strikes of 45° and 60°, respectively. No straight diffracted-wave events can be observed at the upper reflected-wave events in FIG. 6(a) and at the lower reflected-wave events in FIG. 6(b). Therefore, no straight diffracted-wave events can be observed in the dip-angle gathers corresponding to the azimuth angles along the fault strike.

Figures 7A, 7B:
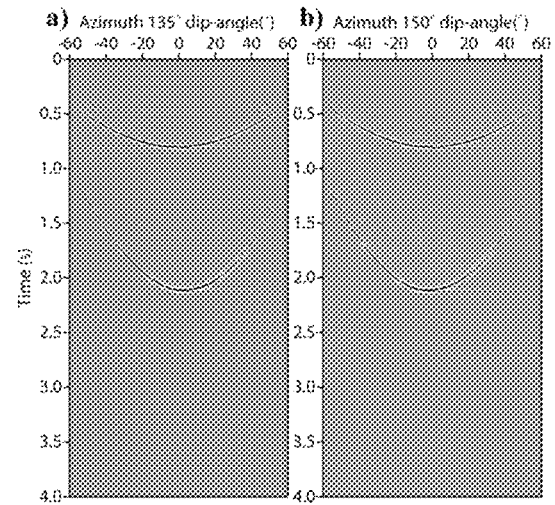
FIG. 7(a) and FIG. 7(b) show dip-angle gathers corresponding to azimuth angles of 135° and 150° at CDP coordinates (2500,2500), respectively.

FIG. 7(a) and FIG. 7(b) show dip-angle gathers corresponding to azimuth angles of 135° and 150° at CDP coordinates (2500,2500). The straight events of diffracted waves generated by the two upper and lower faults in FIG. 4 have the longest lengths and the highest energy at the dip-angle gathers corresponding to the azimuth angles of 135° and 150°, respectively. Therefore, a straight diffracted-wave event observed in a dip-angle gather in an azimuth perpendicular to the fault strike has the highest correlativity. Furthermore, it can be noticed from FIG. 7(a) and FIG. 7(b) that the event of edge diffracted wave generated by the fault exhibits opposite phase characteristics on the two sides of the stationary point in the dip-angle gather.

Figure 8:
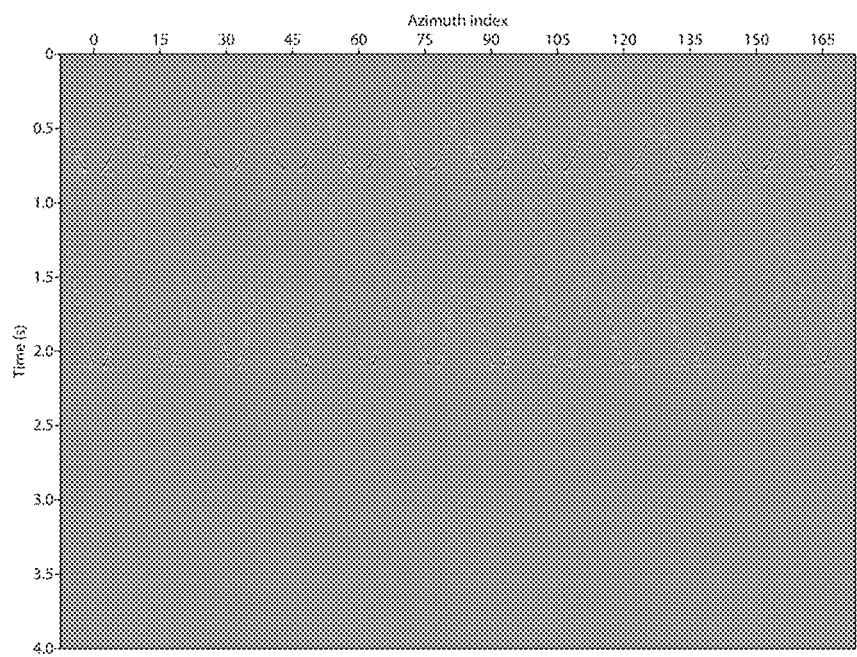
FIG. 8 shows a target azimuth-dip angle gather at CDP coordinates (2500,2500)

FIG. 8 shows a target azimuth-dip angle gather at CDP coordinates (2500,2500). Here, two adjacent azimuth angles are at an interval of 15°. It can be seen from FIG. 8 that the straight events of diffracted waves exhibit different lengths and different energy intensities in the dip-angle gathers in which the Fresnel zones have been muted corresponding to different azimuth angles, thus they have different correlativity. The correlativity may be expressed digitally with a correlation coefficient.

Figures 9A, 9B:
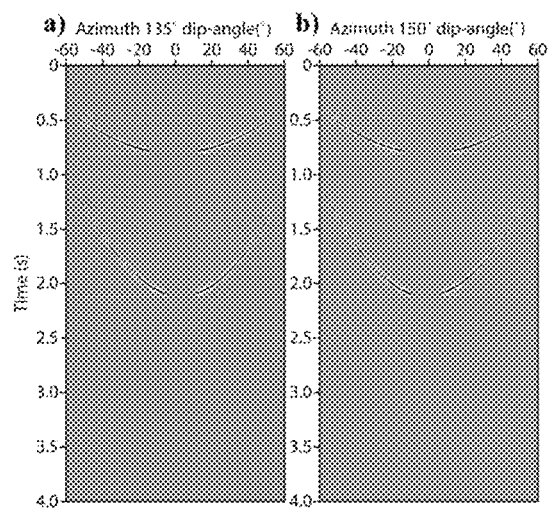
FIG. 9(a) and FIG. 9(b) show dip-angle gathers in which Fresnel zones have been muted corresponding to an azimuth angle of 135° in FIG. 7(a) and an azimuth angle of 150° in FIG. 7(b), respectively.

FIG. 9(a) and FIG. 9(b) show dip-angle gathers in which the Fresnel zones have been muted corresponding to an azimuth angle of 135° in FIG. 7(a) and an azimuth angle of 150° in FIG. 7(b), respectively. It can be seen from FIG. 9(a) and FIG. 9(b) that the relatively straight portions in the vicinity of the stationary points of the events of reflected waves have been muted.

Figure 10:
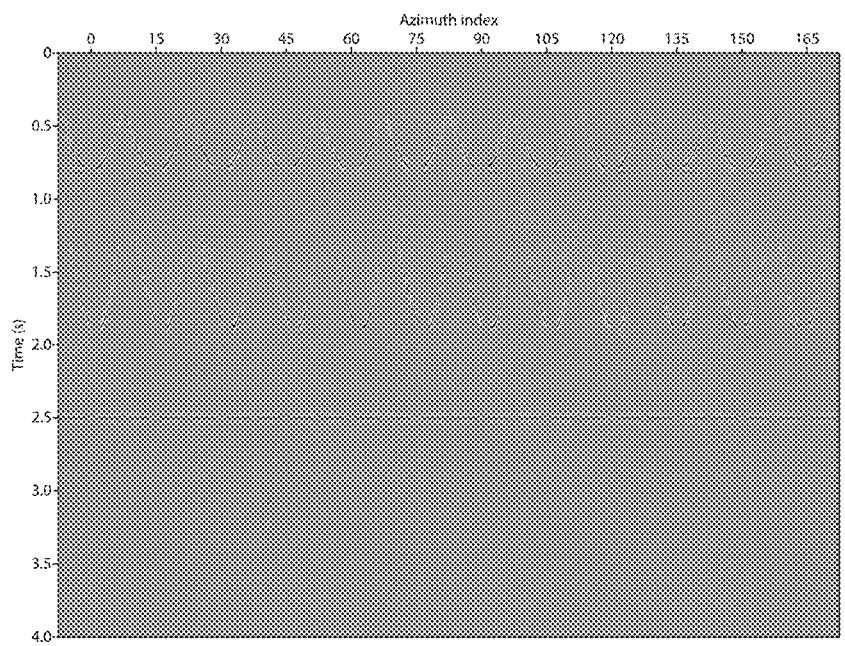
FIG. 10 shows a target azimuth-dip angle gather at CDP coordinates (2000,2000)

FIG. 10 shows a target azimuth-dip angle gather at CDP coordinates (2000,2000). Here, two adjacent azimuth angles are at an interval of 15°. It can be seen from FIG. 10 that the upper fault in FIG. 4 passes through this lateral position, and the lower fault does not pass through this lateral position. In addition, an isolated point in the model of FIG. 4 passes through this lateral position. It can be seen from FIG. 10 that in the dip-angle gathers in which the Fresnel zones have been muted, corresponding to different azimuth angles, the straight diffracted-wave events corresponding to the tip diffracted waves exhibit similar correlativity.

Figures 11A, 11B, 11C:
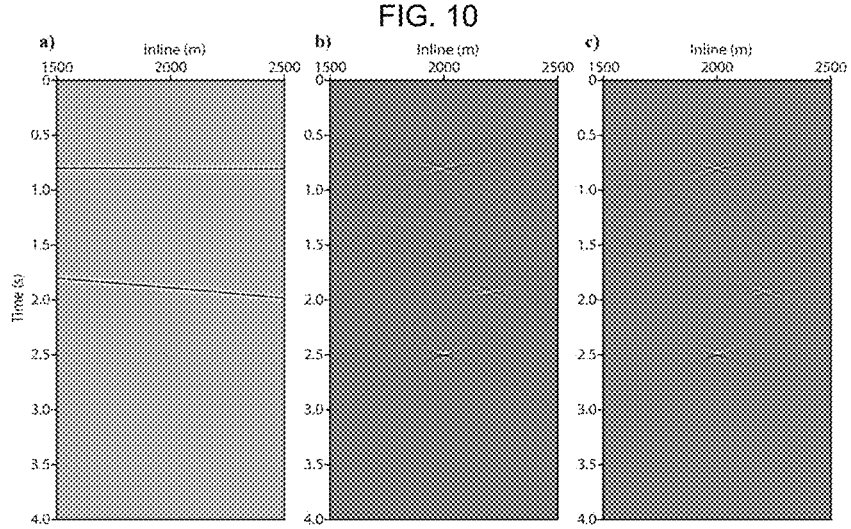
FIG. 11(a), FIG. 11(b), and FIG. 11(c) show a reflected wave migration profile, a phase-uncorrected diffracted wave imaging profile, and a phase-corrected diffracted wave imaging profile obtained from 3D simulation data at Y coordinate=2000 m, respectively.
Figures 12A, 12B:
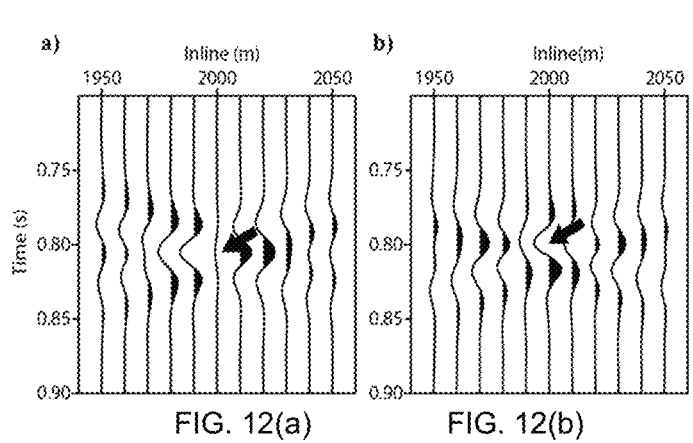
FIG. 12(a) and FIG. 12(b) are enlarged diagrams of waveforms of the upper faults in FIG. 11(b) and FIG. 11(c), respectively.

FIG. 11(a), FIG. 11(b), and FIG. 11(c) show a reflected wave migration profile, a phase-uncorrected diffracted wave imaging profile, and a phase-corrected diffracted wave imaging profile obtained from 3D synthetic data set at Y coordinate=2000 m, respectively. Here, FIG. 11(a) is a reflected wave migration profile, in which a horizontal thin layer, an inclined thin layer, and a weak isolated diffraction point can be seen. FIG. 11(b) and FIG. 11(c) are the corresponding phase-uncorrected and phase-corrected diffracted wave imaging profiles, respectively, in which two faults and one isolated diffraction point can be seen, but the faults in FIG. 11(b) are not focused. FIG. 12(a) and FIG. 12(b) are enlarged diagrams of waveforms of the upper faults in FIG. 11(b) and FIG. 11(c). The fault is located at an abscissa of 2000 m and a vertical coordinate of 0.8 s. It can be seen in FIGS. 12(a) and 12(b) that the energy of FIG. 12(b) is much stronger than that of FIG. 12(a) at the position indicated by the arrow. Therefore, the energy of edge diffracted waves generated by the fault is enhanced after phase correction is performed.

Figures 13A, 13B:
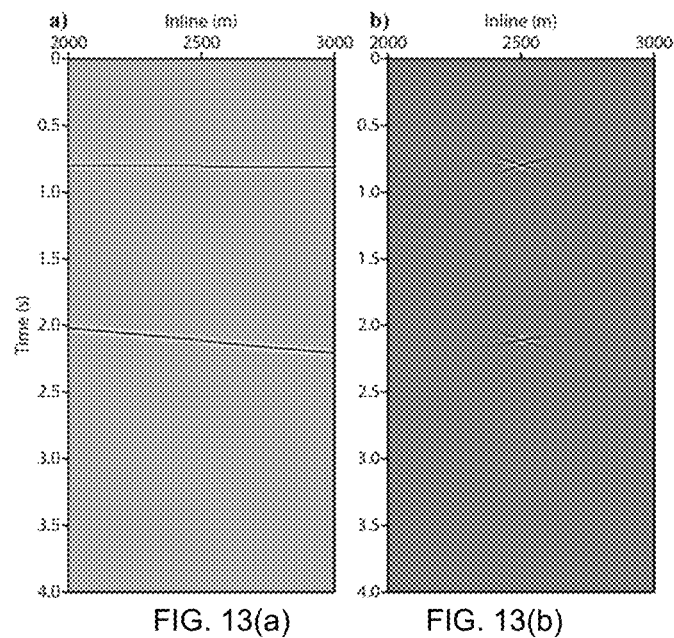
FIG. 13(a) and FIG. 13(b) show a reflected wave migration profile and a phase-corrected diffracted wave imaging profile obtained from 3D simulation data at Y coordinate=2500 m, respectively.

The correction of the phase of diffracted waves is implemented in the Step S103. FIG. 13 (a) and FIG. 13 (b) show a reflected wave migration profile and a phase-corrected diffracted wave imaging profile obtained from 3D s synthetic data set at Y coordinate=2500 m. FIG. 13(a) is a reflected wave migration profile, in which a horizontal thin layer and an inclined thin layer can be observed. FIG. 13(b) is a diffracted wave imaging profile obtained by phase correction in diffracted wave imaging, in which two focused faults can be observed.

The embodiments of the present disclosure provide a method and a device for imaging diffracted waves based on azimuth-dip angle gathers and a storage medium, which have the following advantages: 1) a three-dimensional method is implemented based on azimuth-dip angle gathers, and dip-angle gathers in any azimuth directions can be obtained and configured for the detection and imaging of diffracted waves; 2) the embodiments of the present disclosure allow for distinguishing tip diffracted waves, caused by velocity anomalies such as holes, caves and lithological pinch-outs, from edge diffracted waves caused by faults; 3) phase correction can be implemented during the imaging of edge diffracted waves caused by faults; and 4) the embodiments of the present disclosure not only allow for imaging edge diffracted waves, but also allow for indication of the strikes of faults, which facilitates in-depth study of faults by scientific researchers. In summary, the embodiments of the present disclosure can obtain migration imaging results surpassing the resolution limited by the Ricker's criterion, provide important and beneficial supplements to the high-resolution seismic reflection imaging methods, and will be of great value for use in the identification of natural gas hydrates, characterization of migration pathways of gas-bearing fluids in hydrate deposits, and exploration of deep and ultra-deep lithologic reservoirs and minerals.

As a specific implementation according to the present disclosure:

an embodiment of the present disclosure provides a device for imaging diffracted waves based on azimuth-dip angle gathers. The device for imaging diffracted waves based on azimuth-dip angle gathers is mainly configured to execute the method for imaging diffracted waves based on azimuth-dip angle gathers according to the above description. The device for imaging diffracted waves based on azimuth-dip angle gathers according to the embodiment of the present disclosure will be specifically described below.

Figure 14:
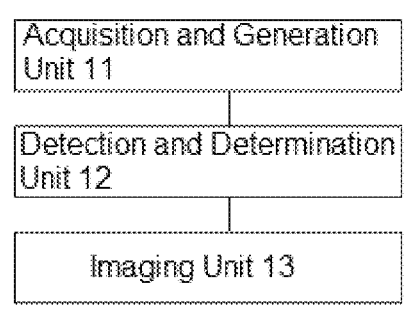
FIG. 14 is a schematic structural diagram of a device for imaging diffracted waves based on azimuth-dip angle gathers according to an embodiment of the present disclosure.

FIG. 14 is a schematic structural diagram of a device for imaging diffracted waves based on azimuth-dip angle gathers according to an embodiment of the present disclosure. As shown in FIG. 14, the device for imaging diffracted waves based on azimuth-dip angle gathers mainly includes an acquisition and generation unit 11, a detection and determination unit 12, and an imaging unit 13.

The acquisition and generation unit 11 is configured to acquire seismic data and generate target azimuth-dip angle gathers based on the seismic data, wherein the target azimuth-dip angle gathers are a set of all azimuth-dip angle gathers in which Fresnel zones have been muted, each of the azimuth-dip angle gathers represents a dip-angle gather corresponding to each azimuth angle, and the azimuth angle is any azimuth angle in an azimuth angle set.

The detection and determination unit 12 is configured to detect diffracted waves based on the target azimuth-dip angle gathers and determine a type of the diffracted waves.

The imaging unit 13 is configured to image the diffracted waves based on the type of the diffracted waves to obtain a diffracted wave imaging result.

An embodiment of the present disclosure provides a device for imaging diffracted waves based on azimuth-dip angle gathers. Firstly, the acquisition and generation unit 11 is used to acquire seismic data and generate target azimuth-dip angle gathers based on the seismic data, then the detection and determination unit 12 is used to detect diffracted waves based on the target azimuth-dip angle gathers and determine the type of the diffracted waves, and finally the imaging unit 13 is used to image the diffracted waves based on the type of the diffracted waves to obtain a diffracted wave imaging result. In the embodiment of the present disclosure, in the generated target azimuth-dip angle gathers, dip-angle gathers corresponding to any azimuth angles are configured for the detection and imaging of diffracted waves, thus the target azimuth-dip angle gathers provide a three-dimensional basis for the detection and imaging of diffracted waves. In the embodiment of the present disclosure, the type of the diffracted waves is determined, and the diffracted waves are imaged based on the type of the diffracted waves. In this way, the type of the diffracted waves can be distinguished, and the diffracted waves can be imaged in a targeted manner, whereby the imaging accuracy is improved.

Optionally, the acquisition and generation unit 11 includes a first determination module, a second determination module, a third determination module, a fourth determination module, a fifth determination module, and a sixth determination module.

The first determination module is configured to determine an azimuth angle set based on the seismic data.

The second determination module is configured to determine two mutually perpendicular azimuth angles in the azimuth angle set as standard azimuth angles.

The third determination module is configured to determine apparent dip angles corresponding to other azimuth angles based on dip angles corresponding to the standard azimuth angles, wherein the other azimuth angles are any azimuth angles in the azimuth angle set other than the standard azimuth angles.

The fourth determination module is configured to determine a Fresnel zone boundary corresponding to each of the azimuth angles based on the dip angle corresponding to each of the standard azimuth angles and the apparent dip angle corresponding to each of the other azimuth angles.

The fifth determination module is configured to determine a weight function corresponding to each of the azimuth angles based on the Fresnel zone boundary corresponding to each of the azimuth angles.

The sixth determination module is configured to determine target azimuth-dip angle gathers based on the weight functions corresponding to all the azimuth angles and a preset azimuth-dip angle gather formula.

Optionally, the acquisition and generation unit 11 further includes a seventh determination module and a first pickup module.

The seventh determination module is configured to determine dip-angle gathers corresponding to the standard azimuth angles.

The first pickup module is configured to pick up dip angles corresponding to the standard azimuth angles by using a human-computer interactive pickup method based on the dip-angle gathers corresponding to the standard azimuth angles.

Optionally, the detection and determination unit 12 includes an eighth determination module, a comparison module, and a ninth determination module.

The eighth determination module is configured to determine a correlation coefficient corresponding to each azimuth-dip angle gather in which the Fresnel zone has been muted, with the each azimuth-dip angle gather included in the target azimuth-dip angle gathers.

The comparison module is configured to compare, with a preset correlation coefficient, the correlation coefficient corresponding to each azimuth-dip angle gather in which the Fresnel zone has been muted.

The ninth determination module is configured to determine that diffracted waves are present in the seismic data, if at least one of the correlation coefficients corresponding to the azimuth-dip angle gathers in which the Fresnel zones have been muted is greater than the preset correlation coefficient.

The detection and generation unit 12 further includes a tenth determination module.

The tenth determination module is configured to determine that no diffracted wave is present in the seismic data, if all the correlation coefficients corresponding to the azimuth-dip angle gathers in which the Fresnel zones have been muted are less than the preset correlation coefficient.

Optionally, the type of the diffracted waves includes tip diffracted waves and edge diffracted waves. The detection and generation unit 12 further includes a judgement module, an eleventh determination module, and a twelfth determination module.

The judgment module is configured to judge whether the correlation coefficients corresponding to all the azimuth-dip angle gathers in which the Fresnel zones have been muted meet a preset tip diffracted wave condition or a preset edge diffracted wave condition.

The eleventh determination module is configured to determine that the diffracted waves are of the type of tip diffracted waves, if the preset tip diffracted wave condition is met.

The twelfth determination module is configured to determine that the diffracted waves are of the type of edge diffracted waves, if the preset edge diffracted wave condition is met.

Optionally, the imaging unit 13 includes a second pickup module, a third pickup module, and a thirteenth determination module.

The second pickup module is configured to stack picked first dip-angle gathers to obtain a first diffracted wave imaging result if the diffracted waves are of the type of tip diffracted waves, wherein the first dip-angle gather is a dip-angle gather in which the Fresnel zones have been muted corresponding to any azimuth angle.

The third pickup module is configured to pick up a second dip-angle gather and subtract energies on the two sides of an apparent dip angle corresponding to the second dip-angle gather if the diffracted waves are of the type of edge diffracted waves, to obtain a second diffracted wave imaging result, wherein the second dip-angle gather is a dip-angle gather in which the Fresnel zones have been muted corresponding to an azimuth angle with the highest correlativity.

The thirteenth determination module is configured to determine the first diffracted wave imaging result and/or the second diffracted wave imaging result as the diffracted wave imaging result.

The foregoing embodiments of the present disclosure provide a method and a device for imaging diffracted waves based on azimuth-dip angle gathers and a storage medium. Firstly, seismic data is acquired, and target azimuth-dip angle gathers are generated based on the seismic data, wherein the target azimuth-dip angle gathers are a set of all azimuth-dip angle gathers in which the Fresnel zones have been muted, each of the azimuth-dip angle gathers represents a dip-angle gather corresponding to each azimuth angle, and the azimuth angle is any azimuth angle in an azimuth angle set. Then, diffracted waves are detected based on the target azimuth-dip angle gathers, and the type of the diffracted waves is determined. Finally, the diffracted waves are imaged based on the type of the diffracted waves to obtain a diffracted wave imaging result. In the present disclosure, in the generated target azimuth-dip angle gathers, dip-angle gathers corresponding to any azimuth angles are configured for the detection and imaging of diffracted waves, thus the target azimuth-dip angle gathers provide a three-dimensional basis for the detection and imaging of diffracted waves. In the present disclosure, the type of the diffracted waves is determined, and the diffracted waves are imaged based on the type of the diffracted waves. In this way, the type of the diffracted waves can be distinguished. Reflected waves and diffracted waves can be correctly separated in three dimensions, and dip-angle gathers in any azimuth directions can be obtained and configured for the detection and imaging of diffracted waves, thereby distinguishing tip diffracted waves, caused by velocity anomalies such as holes, caves and lithological pinch-outs, from edge diffracted waves caused by faults. Fault strike information can be extracted and phase correction can also be implemented during the imaging of the edge diffracted waves caused by faults to improve the imaging accuracy.

In an optional embodiment, this embodiment further provides an electronic device, comprising a memory and a processor. The memory stores computer programs that can run on the processor. The processor implements the steps of the method in the foregoing method embodiment when executing the computer programs.

In an optional embodiment, this embodiment further provides a computer-readable medium having non-volatile program codes executable by a processor, wherein the program codes cause the processor to execute the method in the foregoing method embodiment.

In addition, in the description of the embodiments of the present disclosure, the terms "mount", "couple", and "connect" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

In the description of the embodiments, it should be noted that the terms such as "center", "up", "down", "left", "right", "vertical", "horizontal", "inside", and "outside" indicate the orientational or positional relationships shown based on the figures, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, the terms "first", "second", and "third" are used for descriptive purposes only and should not be understood as an indication or implication of importance in relativity.

It will be clearly appreciated by those skilled in the art that, for convenience and brevity of the description, the specific operating processes of the device and units described above may be performed with reference to the corresponding processes in the foregoing embodiment of the method and will not be described in detail herein.

In several embodiments according to the present disclosure, it should be understood that the disclosed method and device may be implemented in other ways. The embodiments of the device described above are merely illustrative in nature. For example, the units are divided only by logical functions, and additional division modes may be adopted in practical implementation. For another example, multiple units or components may be combined or integrated into another system, or some features may be omitted or not executed. In addition, the mutual coupling, or direct coupling or communication connection illustrated or discussed may be implemented via indirect coupling or communication between some communication interfaces, devices, or units, which may be electronic, mechanical, or in other forms.

The units described as separate components may be or not be separated physically. The components illustrated as units may be or not be physical units. In other words, they may be located at one place or they may be distributed onto multiple network units. Some or all of the units may be selected as actually required to fulfill the purposes of the solutions of the present embodiments.

Besides, the individual functional units in the embodiments of the present disclosure may be integrated into one processing unit, or each of the units may be physically stand-alone, or two or more of the units may be integrated into one unit.

When implemented in the form of a software functional module and sold or used as an independent product, the functions may be stored in a non-volatile computer-readable storage medium executable by a processor. Based on such understanding, a technical solution of the present embodiment essentially, or the part thereof contributing to the prior art, or a part of the technical solution may be embodied in the form of a software product. The computer software product is stored in a storage medium, and includes a number of instructions for causing a computer device (which may be a personal computer, a server, a network device, or the like) to execute all or some of the steps of the methods described in the various embodiments of the present disclosure. The preceding storage medium includes any medium that can store program codes, such as a USB flash disk, a mobile hard disk, a read-only memory (ROM), a random access memory (RAM), a magnetic disk, or an optical disk.

Finally, it should be noted that the embodiments described above are merely specific embodiments of the present disclosure, which are intended to illustrate the technical solutions of the present disclosure and not intended to limit the present disclosure, and to which the scope of protection of the present disclosure is not limited. Although the present disclosure has been described in detail with reference to the foregoing embodiments, it should be understood by those skilled in the art that the technical solutions disclosed in the foregoing embodiments can be modified, or variations thereof can be readily envisaged, or some of the technical features thereof can be equivalently replaced by those skilled in the art within the technical scope disclosed in the present disclosure. Such modifications, variations, or replacements do not cause the essence of the corresponding technical solution to depart from the spirit and scope of the technical solutions of the embodiments of the present disclosure, and are therefore intended to be encompassed within the scope of protection of the present disclosure.

INDUSTRIAL APPLICABILITY

With the use of the method and device for imaging diffracted waves based on azimuth-dip angle gathers and a storage medium according to the present disclosure, reflected waves and diffracted waves can be correctly separated in three dimensions, and dip-angle gathers in any azimuth directions can be obtained and configured for the detection and imaging of diffracted waves, thereby distinguishing tip diffracted waves, caused by velocity anomalies such as holes, caves and lithological pinch-outs, from edge diffracted waves caused by faults. Fault strike information can be extracted and phase correction can also be implemented during the imaging of the edge diffracted waves caused by faults to improve the imaging accuracy.

What is claimed is:

1. A method for imaging diffracted waves based on azimuth-dip angle gathers, comprising:
    acquiring seismic data and generating target azimuth-dip angle gathers based on the seismic data, wherein the target azimuth-dip angle gathers are a set of all azimuth-dip angle gathers in which Fresnel zones have been muted, each of the azimuth-dip angle gathers represents a dip-angle gather corresponding to each azimuth angle, and the azimuth angle is any azimuth angle in an azimuth angle set;
    detecting diffracted waves based on the target azimuth-dip angle gathers and determining a type of the diffracted waves; and
    imaging the diffracted waves based on the type of the diffracted waves to obtain a diffracted wave imaging result,
wherein the detection of diffracted waves based on the target azimuth-dip angle gathers comprises:
    determining a correlation coefficient corresponding to each azimuth-dip angle gather in which the Fresnel zones have been muted, with the each azimuth-dip angle gather included in the target azimuth-dip angle gathers;
    comparing, with a preset correlation coefficient, the correlation coefficient corresponding to the each azimuth-dip angle gather in which the Fresnel zones have been muted; and
    determining that diffracted waves are present in the seismic data, if at least one of the correlation coefficients corresponding to the azimuth-dip angle gathers in which the Fresnel zones have been muted is greater than the preset correlation coefficient.

2. The method for imaging diffracted waves based on azimuth-dip angle gathers according to claim 1, wherein the generation of target azimuth-dip angle gathers based on the seismic data comprises:
    determining an azimuth angle set based on the seismic data;
    determining two mutually perpendicular azimuth angles in the azimuth angle set as standard azimuth angles;
    determining apparent dip angles corresponding to other azimuth angles based on dip angles corresponding to the standard azimuth angles, wherein the other azimuth angles are any azimuth angles in the azimuth angle set other than the standard azimuth angles;
    determining a Fresnel zone boundary corresponding to each of the azimuth angles based on the dip angle corresponding to each of the standard azimuth angles and the apparent dip angle corresponding to each of the other azimuth angles;
    determining a weight function corresponding to each of the azimuth angles based on the Fresnel zone boundary corresponding to each of the azimuth angles; and
    determining the target azimuth-dip angle gathers based on the weight functions corresponding to all the azimuth angles and a preset azimuth-dip angle gather formula.

3. The method for imaging diffracted waves based on azimuth-dip angle gathers according to claim 2, further comprising, after determining two mutually perpendicular azimuth angles in the azimuth angle set as standard azimuth angles,
    determining dip-angle gathers corresponding to the standard azimuth angles; and
    picking up dip angles corresponding to the standard azimuth angles by using a human-computer interactive pickup method based on the dip-angle gathers corresponding to the standard azimuth angles.

4. The method for imaging diffracted waves based on azimuth-dip angle gathers according to claim 1, further comprising:
determining that no diffracted wave is present in the seismic data, if all the correlation coefficients corresponding to the azimuth-dip angle gathers in which the Fresnel zones have been muted are less than the preset correlation coefficient.

5. The method for imaging diffracted waves based on azimuth-dip angle gathers according to claim 1, wherein the type of the diffracted waves comprises tip diffracted waves and edge diffracted waves, and the determination of the type of the diffracted waves comprises:
judging whether the correlation coefficients corresponding to all the azimuth-dip angle gathers in which the Fresnel zones have been muted meet a preset tip diffracted wave condition or a preset edge diffracted wave condition;
determining that the diffracted waves are of the type of tip diffracted waves, if the preset tip diffracted wave condition is met; and
determining that the diffracted waves are of the type of edge diffracted waves, if the preset edge diffracted wave condition is met.

6. The method for imaging diffracted waves based on azimuth-dip angle gathers according to claim 5, wherein the imaging of the diffracted waves based on the type of the diffracted waves to obtain a diffracted wave imaging result comprises:
if the diffracted waves are of the type of tip diffracted waves, stacking picked first dip-angle gathers to obtain a first diffracted wave imaging result, wherein the first dip-angle gather is a dip-angle gather, with the Fresnel zone having been muted, which is corresponding to any azimuth angle;
if the diffracted waves are of the type of edge diffracted waves, picking up a second dip-angle gather and subtracting energies on the two sides of an apparent dip angle corresponding to the second dip-angle gather to obtain a second diffracted wave imaging result, wherein the second dip-angle gather is a dip-angle gather with the Fresnel zone having been muted, which is corresponding to an azimuth angle with the highest correlativity; and
determining the first diffracted wave imaging result and/or the second diffracted wave imaging result as the diffracted wave imaging result.

7. A device for imaging diffracted waves based on azimuth-dip angle gathers, comprising:
an acquisition and generation unit configured to acquire seismic data and generate target azimuth-dip angle gathers based on the seismic data, wherein the target azimuth-dip angle gathers are a set of all azimuth-dip angle gathers in which Fresnel zones have been muted, each of the azimuth-dip angle gathers represents a dip-angle gather corresponding to each azimuth angle, and the azimuth angle is any azimuth angle in an azimuth angle set;
a detection and determination unit configured to detect diffracted waves based on the target azimuth-dip angle gathers and determine a type of the diffracted waves; and
an imaging unit configured to image the diffracted waves based on the type of the diffracted waves to obtain a diffracted wave imaging result,
wherein operations performed by the detection and determination unit comprise:
determining a correlation coefficient corresponding to each azimuth-dip angle gather in which the Fresnel zones have been muted, with the each azimuth-dip angle gather included in the target azimuth-dip angle gathers;
comparing, with a preset correlation coefficient, the correlation coefficient corresponding to each azimuth-dip angle gather in which the Fresnel zones have been muted; and
determining that diffracted waves are present in the seismic data, if at least one of the correlation coefficients corresponding to the azimuth-dip angle gathers in which the Fresnel zones have been muted is greater than the preset correlation coefficient.

8. The device for imaging diffracted waves based on azimuth-dip angle gathers according to claim 7, wherein operations performed by the acquisition and generation unit comprise:
determining an azimuth angle set based on the seismic data;
determining two mutually perpendicular azimuth angles in the azimuth angle set as standard azimuth angles;
determining apparent dip angles corresponding to other azimuth angles based on dip angles corresponding to the standard azimuth angles, wherein the other azimuth angles are any azimuth angles in the azimuth angle set other than the standard azimuth angles;
determining a Fresnel zone boundary corresponding to each of the azimuth angles based on the dip angle corresponding to each of the standard azimuth angles and the apparent dip angle corresponding to each of the other azimuth angles;
determining a weight function corresponding to each of the azimuth angles based on the Fresnel zone boundary corresponding to each of the azimuth angles; and
determining target azimuth-dip angle gathers based on the weight functions corresponding to all the azimuth angles and a preset azimuth-dip angle gather formula.

9. The device for imaging diffracted waves based on azimuth-dip angle gathers according to claim 8, wherein operations performed by the acquisition and generation unit comprise:
determining dip-angle gathers corresponding to the standard azimuth angles; and
picking up dip angles corresponding to the standard azimuth angles by using a human-computer interactive pickup method based on the dip-angle gathers corresponding to the standard azimuth angles.

10. The device for imaging diffracted waves based on azimuth-dip angle gathers according to claim 7, wherein operations performed by the detection and determination unit comprise:
determining that no diffracted wave is present in the seismic data, if all the correlation coefficients corresponding to the azimuth-dip angle gathers in which the Fresnel zones have been muted are less than the preset correlation coefficient.

11. The device for imaging diffracted waves based on azimuth-dip angle gathers according to claim 7, wherein operations performed by the detection and determination unit comprise:
judging whether the correlation coefficients corresponding to all the azimuth-dip angle gathers in which the Fresnel zones have been muted meet a preset tip diffracted wave condition or a preset edge diffracted wave condition;

determining that the diffracted waves are of the type of tip diffracted waves, if the preset tip diffracted wave condition is met; and determining that the diffracted waves are of the type of edge diffracted waves, if the preset edge diffracted wave condition is met.

12. The device for imaging diffracted waves based on azimuth-dip angle gathers according to claim 11, wherein operations performed by the imaging unit comprise:

if the diffracted waves are of the type of tip diffracted waves, stacking picked first dip-angle gathers to obtain a first diffracted wave imaging result, wherein the first dip-angle gather is a dip-angle gather with the Fresnel zone having been muted, which is corresponding to any azimuth angle;

if the diffracted waves are of the type of edge diffracted waves, picking up a second dip-angle gather and subtracting energies on the two sides of an apparent dip angle corresponding to the second dip-angle gather to obtain a second diffracted wave imaging result, wherein the second dip-angle gather is a dip-angle gather with the Fresnel zone having been muted, which is corresponding to an azimuth angle with the highest correlativity; and determining the first diffracted wave imaging result and/or the second diffracted wave imaging result as the diffracted wave imaging result.

13. A computer-executable non-volatile program code storage medium, the storage medium storing program codes, wherein the program codes are configured to execute, when run by a computer, the method for imaging diffracted waves based on azimuth-dip angle gathers according to claim 1.

* * * * *